United States Patent [19]
Piritore et al.

[11] Patent Number: 5,176,567
[45] Date of Patent: Jan. 5, 1993

[54] AIR OUTLET FOR MOTOR-VEHICLE AIR-CONDITIONING SYSTEMS

[75] Inventors: Giuseppe Piritore, Venaria; Antonio Tarzia, Pinerolo, both of Italy

[73] Assignee: Fiat Auto SpA, Turin, Italy

[21] Appl. No.: 770,211

[22] Filed: Oct. 3, 1991

[30] Foreign Application Priority Data

Oct. 3, 1991 [IT] Italy ................. 67754 A/90

[51] Int. Cl.⁵ .................... B60H 1/34; F24F 13/06
[52] U.S. Cl. ............................ 454/155; 454/305
[58] Field of Search .............. 454/152 (U.S. only), 454/155 (U.S. only), 303 (U.S. only), 305 (U.S. only); 98/2 (Foreign only), 40.16 (Foreign only), 40.18 (Foreign only)

[56] References Cited

U.S. PATENT DOCUMENTS

| | | | |
|---|---|---|---|
| 3,659,515 | 5/1972 | Galaniuk | 454/152 |
| 3,699,872 | 10/1972 | Kruger | 454/303 |
| 3,861,281 | 1/1975 | Godwin | 454/155 |
| 4,345,510 | 8/1982 | Sterett | 454/155 X |
| 4,610,196 | 9/1986 | Kern | 454/155 X |
| 4,887,520 | 12/1989 | Bauer | 454/155 |

FOREIGN PATENT DOCUMENTS

| | | |
|---|---|---|
| 2933083 | 2/1981 | Fed. Rep. of Germany . |
| 3333878 | 3/1985 | Fed. Rep. of Germany . |
| 632014 | 11/1949 | United Kingdom . |
| 1006828 | 10/1965 | United Kingdom . |
| 2195758A | 4/1988 | United Kingdom ........ 98/40.16 |

Primary Examiner—Allen J. Flanigan
Attorney, Agent, or Firm—Sughrue, Mion, Zinn, Macpeak & Seas

[57] ABSTRACT

A ventilation outlet for use in a motor-vehicle dashboard has a cylindrical distributor with an outlet slot facing an outlet hole in the dashboard. A duct with converging walls is interposed between the outlet slot in the rotatable distributor and the outlet hole to direct the air-flow in a predetermined direction according to the position of the distributor, without the use of deflecting vanes.

9 Claims, 3 Drawing Sheets

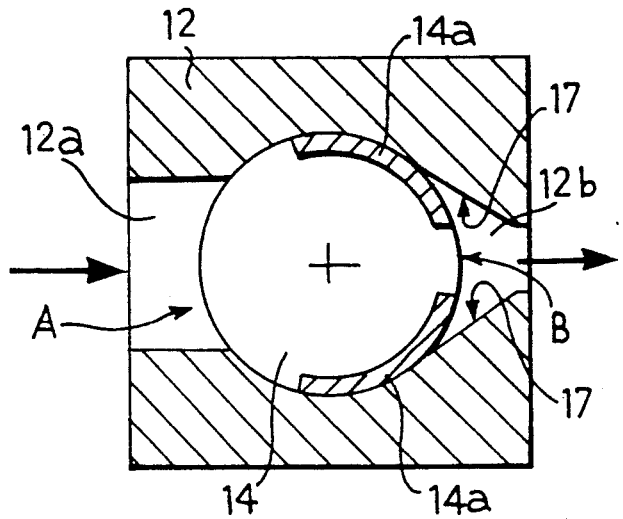
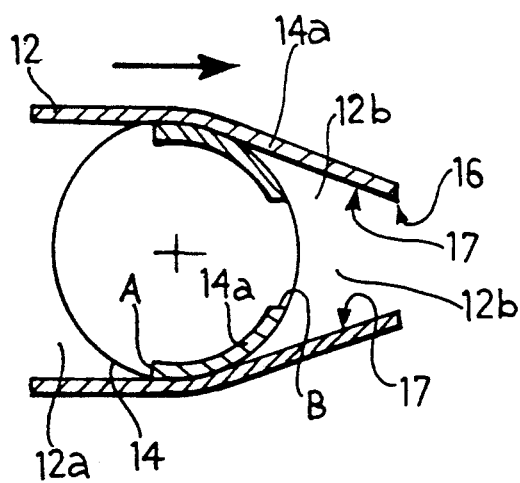
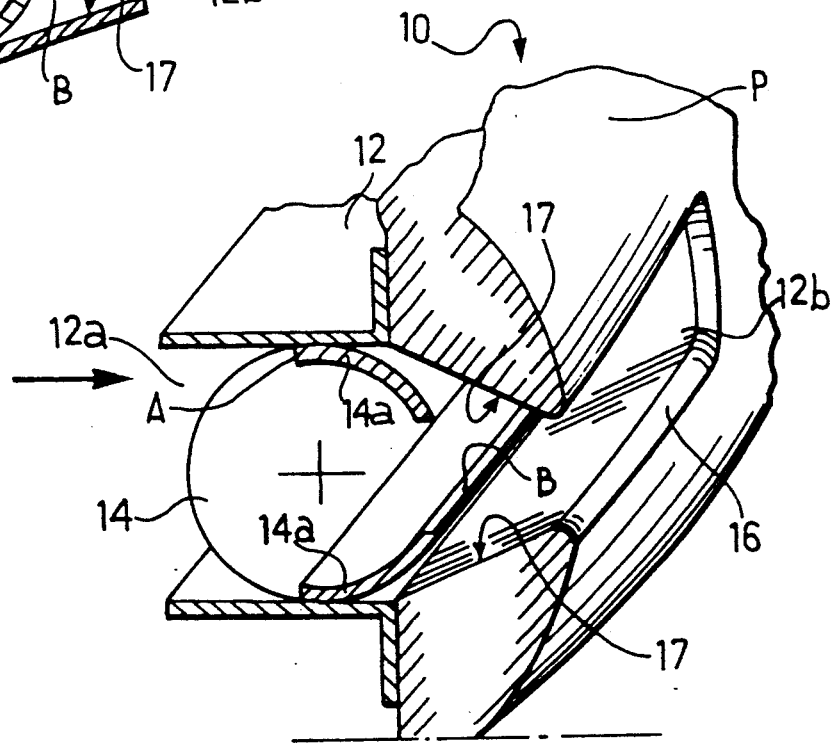

AIR OUTLET FOR MOTOR-VEHICLE AIR-CONDITIONING SYSTEMS

BACKGROUND OF THE INVENTION

The present invention relates to an air outlet, particularly for motor-vehicle air-conditioning systems.

Air outlets, commonly known as "vents", often present problems as regards their stylistic compatibility with the design of the dashboard in that it is difficult to integrate them with its lines and surfaces. Moreover, the small maximum angles of deflection of the air-flow in a vertical plane often cause problems for the passengers who are struck more or less directly by the jet of air.

SUMMARY OF THE INVENTION

The object of the present invention is to provide an air outlet of the type specified at the beginning of the description which resolves the aforesaid problems simply and cheaply.

According to the invention, this object is achieved by virtue of the fact that the air outlet includes a cylindrical distributor rotatable in a hollow support body and having a lateral outlet aperture, and a duct located beside the distributor and having walls which converge substantially towards its outlet hole, the position of the outlet aperture being variable relative to the position of the outlet hole so that the air-flow from the hole is oriented in a predetermined direction.

By virtue of these characteristics, the deflection of the air in the air outlet of the invention is due to a dynamic flow effect, the flow being directed towards one of the converging walls of the duct by the lateral aperture in the distributor element so that deflection vanes are not needed. The air outlet of the invention is particularly adapted to deflect the air-flow in a vertical plane, whilst any deflection in a horizontal plane can be achieved by conventional orientable vanes.

This fluid-dynamic deflection enables the outlet hole to be constituted by a narrow slot which can easily be integrated with the design of the dashboard and, moreover, can be used as an aesthetic motif thereof. A further advantage of the device according to the invention lies in the fact that the flow can be deflected from its normal outflow direction through large maximum angles of nearly 90°.

BRIEF DESCRIPTION OF THE DRAWINGS

Further advantages and characteristics of the device according to the invention will become clear from the detailed description which follows, provided purely by way of non-limiting example, with reference to the appended drawings, in which:

FIG. 5 is a view similar to FIG. 1, showing a variant of the air outlet, FIG. 6 shows a further variant of the air outlet in which the duct with converging walls is formed in the support body of the air outlet, FIG. 7 shows a variant in which the duct with converging walls is formed in the dashboard of a motor vehicle.

DETAILED DESCRIPTION OF THE INVENTION

Figure 1:
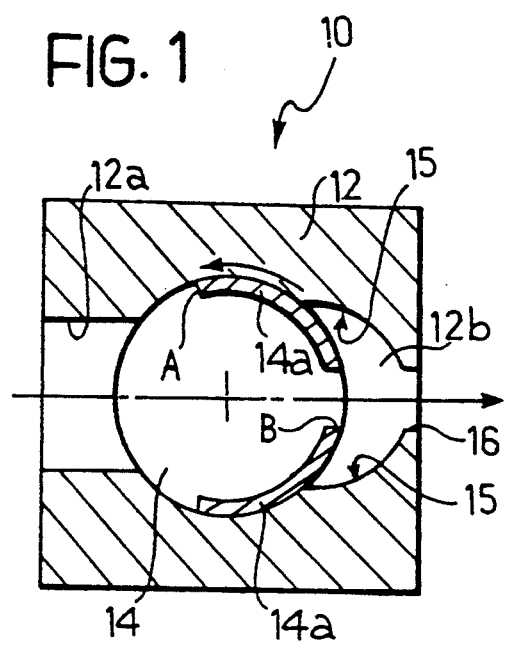
FIG. 1 is a schematic cross-sectional view of an air outlet according to the invention.

With reference to the drawings, an air outlet, generally indicated 10, is constituted by a hollow body 12 containing a rotatable cylindrical distributor 14 with lateral wall portions 14a defining an inlet aperture A and an outlet aperture B for the air. The hollow support body 12 has an inlet duct 12a (which, in the configuration illustrated in FIG. 1, is in communication with the inlet aperture A of the cylindrical distributor 14) and an outlet duct 12b with converging curved walls 15 defining a cavity which faces substantially towards the distributor 14. The walls 15 converge towards an outlet hole 16 which is adapted to be flush with the dashboard of the motor vehicle and whose shape and dimensions correspond substantially to those of the outlet aperture B in the distributor 14.

Figure 2:
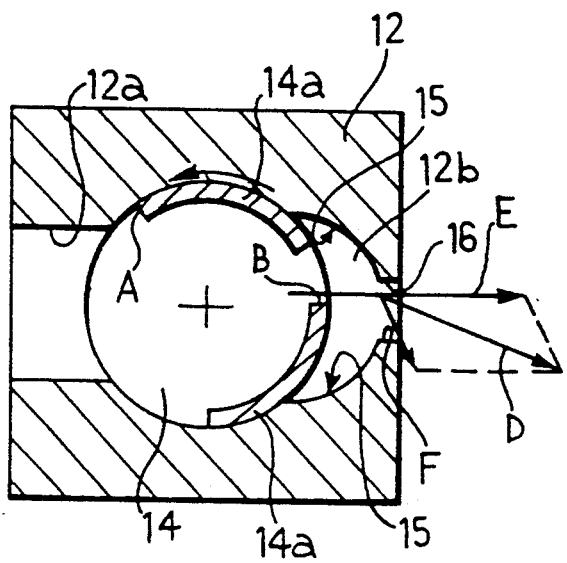
FIGS. 2-4 are similar to FIG. 1 and show three different configurations of the air outlet for the partial deflection of the air-flow, for its maximum deflection, and for shutting it off, respectively.

FIG. 2 relates to an intermediate configuration for the partial deflection of the air-flow in a vertical plane and shows the operating principle of the air outlet of the invention, in which an upward rotation (with reference to the drawings) of the outlet aperture B corresponds to a downward deflection of the air-flow which flows out in the direction indicated by the line D in FIG. 2. This line is the result of the vectorial composition of the line E representing the horizontal outflow and the line F representing the outflow substantially tangential to one of the curved converging surfaces 15 near the hole 16.

Figure 4:
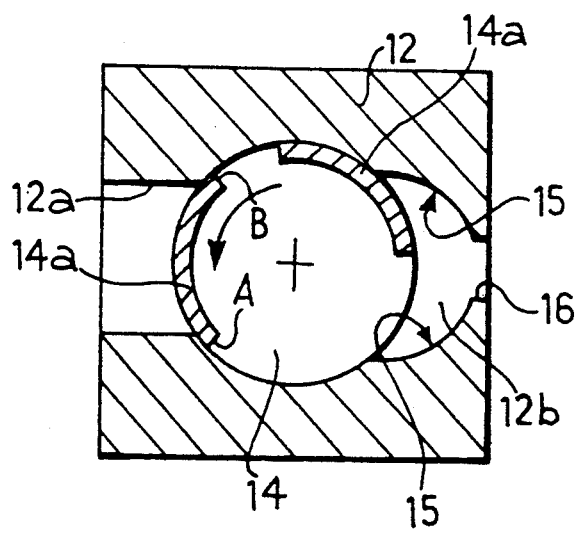
Figure 3:
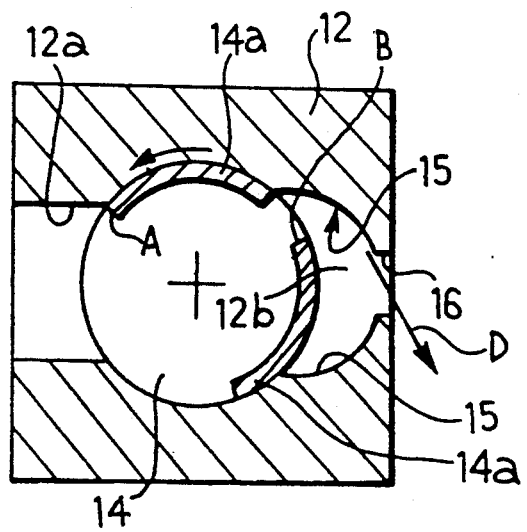

The continued rotation of the cylindrical distributor 14 in the sense indicated in the drawings achieves the maximum deflection of the flow in the vertical plane, as shown in FIG. 3. A further rotation of the cylindrical distributor 14 (FIG. 4) completely shuts off the air-flow to the outlet hole 16.

The variant shown in FIG. 5 differs only in the shape of the duct 12b which has flat converging walls 17.

In the manufacture of the air outlet, in practice, the hollow support body 12 may also include the duct 12b with converging walls, as shown in FIG. 6. Alternatively, the body 12 of the air outlet may be fitted (FIG. 7) to a motor-vehicle dashboard P which defines both the duct 12b with its converging walls 17 and the outlet hole 16 which, in the embodiment shown in FIG. 7, is in the form of a rectangular slot.

Figure 8:
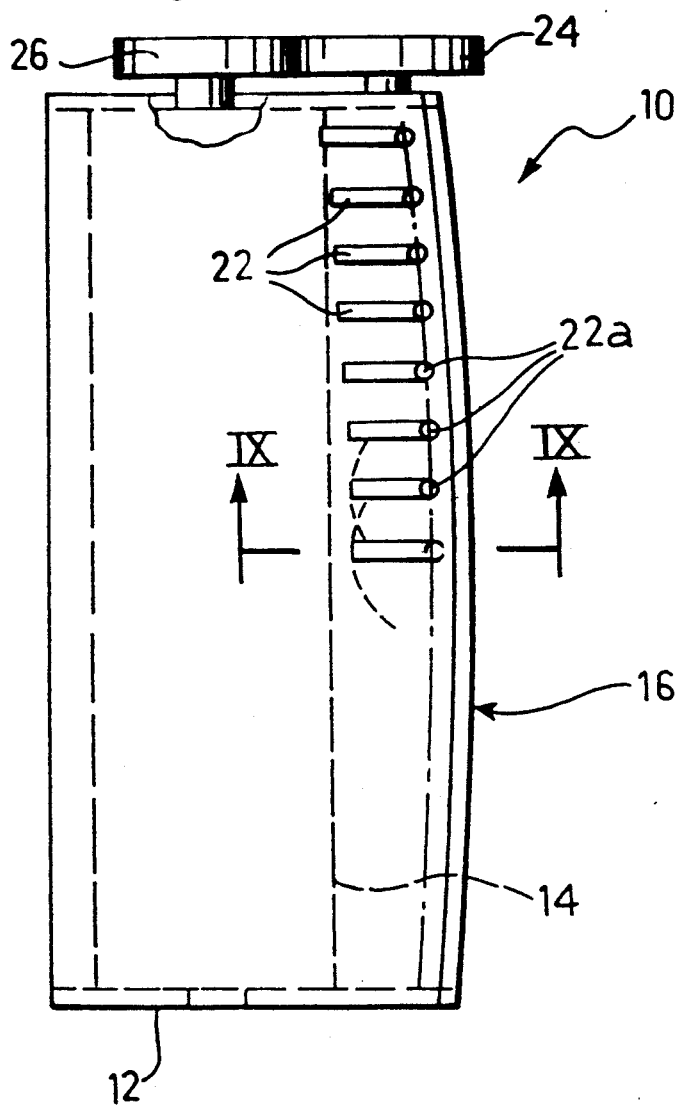
FIG. 8 is a plan view of another embodiment of the outlet which has a plurality of orientable vanes for deflecting the air-flow in a direction other than that in which it is deflected by the rotation of the distributor.
Figure 9:
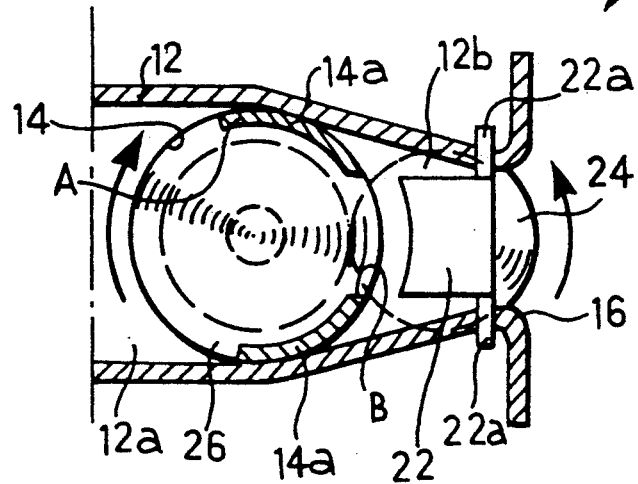
FIG. 9 is a section taken on the line IX—IX of FIG. 8.

In the embodiment shown in FIGS. 8-9, the duct 12b with converging walls has a plurality of parallel orientable vanes 22 with articulation pins 22a supported for rotation by the walls of the duct. In this embodiment, the air-flow can thus be deflected sideways as well as in a vertical plane.

Any system currently in use may be used to rotate the cylindrical distributor 14. FIGS. 8-9 show, by way of example, an embodiment of an operating device including a ring 24 which projects partially from the dashboard and drives a wheel 26 keyed to the cylindrical distributor 14.

What is claimed is:

1. An air outlet, particularly for motor vehicle air-conditioning systems, wherein a cylindrical distributor is rotatably mounted in a hollow support body and has a lateral outlet aperture, a duct having an outlet hole being located beside the distributor and having curved walls which converge substantially towards said outlet hole and define a cavity facing the distributor, the position of the outlet aperture in the cylindrical distributor being variable relative to the position of the outlet hole so that the air flow from the hole is oriented in a predetermined direction.

2. An air outlet according to claim 1, wherein the shape and dimensions of the outlet aperture in the distributor correspond substantially to those of the outlet hole.

3. An air outlet according to claim 1, wherein a plurality of parallel orientable vanes are provided in the cavity for further deflecting the air flow.

4. An air outlet according to claim 1, wherein the duct is integral with the hollow support body of the air outlet.

5. An air outlet according to claim 1, wherein the duct is formed in the dashboard of the motor vehicle, to which the hollow support body of the air outlet is fitted.

6. An air outlet, particularly for motor vehicle air conditioning systems, wherein a hollow distributor is rotatably mounted in a hollow support body and has a lateral air-outlet aperture, a duct having an outlet hole being located beside the distributor and having walls which converge substantially towards said outlet hole, the position of the outlet aperture in the cylindrical distributor being variable relative to the position of the outlet hole so that the air flow from the hole is oriented in a predetermined direction and wherein the cylindrical distributor has a lateral air-inlet aperture opposite the lateral air-outlet aperture.

7. An air outlet according to claim 6, wherein the converging walls of the duct are curved and define a cavity facing the distributor element.

8. An air outlet according to claim 6, wherein the converging walls of the duct are substantially flat.

9. An air outlet according to claim 6, wherein a plurality of parallel orientable vanes are provided in the cavity for further deflecting the air flow.

* * * * *

UNITED STATES PATENT AND TRADEMARK OFFICE
CERTIFICATE OF CORRECTION

PATENT NO. : 5,176,567

DATED : January 5, 1993

INVENTOR(S) : Giuseppe PIRITORE and Antonio TARZIA

It is certified that error appears in the above-identified patent and that said Letters Patent is hereby corrected as shown below:

Title page,
item [30] Foreign Application Priority Data

Oct. 3, 1990 [IT]  Italy ..... 67754 A/90 --

Signed and Sealed this

Fifth Day of April, 1994

Attest:

BRUCE LEHMAN

*Attesting Officer*    *Commissioner of Patents and Trademarks*